United States Patent [19]
Su et al.

[11] Patent Number: 5,257,265
[45] Date of Patent: Oct. 26, 1993

[54] METHOD AND APPARATUS FOR REDUCING MULTIPATH DISTORTION

[75] Inventors: Chun-Meng Su, Lafayette; Chanchai Poonpol, San Diego; George M. Peponides, Encinitas, all of Calif.

[73] Assignee: Pacific Communications, San Diego, Calif.

[21] Appl. No.: 741,310

[22] Filed: Aug. 7, 1991

[51] Int. Cl.$^5$ .............................................. H04J 3/06
[52] U.S. Cl. ................................... 370/100.1; 375/12
[58] Field of Search ................. 370/100.1; 375/11, 12, 375/13, 14, 15, 16, 101, 102, 95; 455/52.1, 52.3, 303, 304

[56] References Cited

U.S. PATENT DOCUMENTS

| | | | |
|---|---|---|---|
| 4,852,090 | 7/1989 | Borth | 370/104 |
| 5,097,482 | 3/1992 | Serizawa et al. | 375/12 |

OTHER PUBLICATIONS

S. Ariyavisitakul, 'A Decision-feedback Equalizer with selective time-reversal operation for high-rate indoor radio Communication,' IEEE Globecom (1990) pp. 2035-2039.

S. Ariyavisitakul, 'Equalization of a hard-limited slowly-Fading Multipath Signal using a Phase Equalizer with a Time-Reversal Structure,' IEEE Globecom (1990) pp. 520-526.

*Primary Examiner*—Douglas W. Olms
*Assistant Examiner*—Shick Hom
*Attorney, Agent, or Firm*—Woodcock Washburn Kurtz Mackiewicz & Norris

[57] ABSTRACT

For every TDMA block the receiver operation starts with a forward processing procedure and operates on received samples in a first-in first-served order. A sync word detector 32a (see FIG. 4 ) ensures the correct TDMA frame timing and starts the equalizer training. Detected data is stacked in a decision buffer 46. An adaptive equalizer 34a outputs a decision error signal that is used to generate a latch-type loss-of-lock flag. Without loss-of-lock, the receiver works through to the last data symbol and the frame processing is finished.

Forward processing is halted and the receiver switches to a backward processing branch if the receiver loses lock midway through the data block. The backward processing branch processes received samples from the input buffer 30 in reverse order. The sync word detector 32b detects the reverse trailing sync word (SYNC #2) and recovers the TDMA symbol timing. The receiver then trains the equalizer and starts data processing in a reverse mode. The detected data is then stacked in the decision buffer 46, starting from Nth symbol. The reverse loss-of-lock detector works the same as the forward loss-of-lock detector, however the control logic is modified such that backward processing works until either detected data overwrites a portion of the forward-processed data, or a loss-of-lock is declared. In the former case, the frame processing is finished. In the latter case, the midpoint between the two loss-of-lock points is calculated and, if needed, both processes are enabled toward the midpoint.

24 Claims, 6 Drawing Sheets

METHOD AND APPARATUS FOR REDUCING MULTIPATH DISTORTION

FIELD OF THE INVENTION

The present invention generally relates to radio-frequency (RF) communications and more particularly relates to methods and apparatuses for equalizing multipath propagation characteristics in time-division multiple access (TDMA) signals and/or time-division multiplexing (TDM) signals.

BACKGROUND OF THE INVENTION

A cellular radio system uses a grid of small service cells (or service zones) and a specific pattern of channel use within the group of service cells so that channels can be reused in a controlled way. A call in a cellular system is routed to a mobile unit via land-line trunks to a cell site (i.e., a stationary transmitter) in the vicinity of the mobile unit. Low-power RF transmission from the cell site is used for the last few miles. System logic locates an active user within the grid in order to hand off control of the call to the proper cell site as the signal strength of the active user changes.

TDMA is a communication technique used in cellular radio systems whereby users communicate with each other on the basis of non-overlapping transmission bursts through a common channel. Since there is no overlap, the same carrier frequency may be assigned to all users sharing the channel. Multiple access refers to techniques that allow a plurality of stations to communicate via a single channel. In TDMA, each interval of $T_F$ seconds, called a frame, is divided into discrete time slots. Each user may use one or more time slots.

The main impairments in received signals are the result of propagation effects. Multipath propagation due to scatter from obstructions within a few hundred feet of the receiving terminal, multipath propagation due to large echoes from distant but large reflectors, and shadowing of the direct path by intervening larger-scale features of the terrain each may contribute to the signal impairment. The effect of multipath propagation is a standing-wave pattern in space determined by the amplitude and phase relationships between the direct and reflected and/or scattered energy components. In a cellular system a vehicle moving through this standing wave pattern will experience short-term fluctuations in signal intensity, typically with a period of a fraction of a second. See, e.g., A. F. Inglis, *Electronic Communications Handbook*, Chapter 22-6, McGraw-Hill, Inc. (1988).

Multipath propagation interference significantly limits the maximum permissible data rate for a mobile RF channel. Multipath propagation in urban and suburban areas causes signal impairments that, if not counteracted, degrade signal reception and voice quality. The difficulty of dealing with these impairments is compounded by the fact that, due to the mobile nature of the application, the channel characteristics as perceived by the receiver are time-variant.

There are two major classes of impairments caused by multipath propagation: Flat (or frequency non-selective) fading and frequency selective fading. Flat fading is caused by multipath conditions in which the differential propagation delay between different paths is significant with respect to the carrier period but negligible compared to the symbol period (i.e., the duration of a transmitted symbol represented by a predefined number of bits) of the signalling scheme used. Frequency selective fading occurs when the differential propagation delay is a major fraction (>25%) of the signalling or symbol period, in which case the frequency characteristics of the channel vary within the bandwidth of the transmitted signal.

Flat fading results, e.g., when digital data is transmitted at a rate of 5 ksps (5000 symbols per second) at a carrier frequency close to 900 MHz with differential propagation delays of 10 $\mu$sec or less. The differential propagation delay in this case is much larger than the carrier period but only a small fraction (5%) of the symbol period; thus the amplitude and phase of the received signal continuously change when the receiver moves under these conditions. This is because the received signal is the vector sum of the direct and multipath signals, which constructively and destructively add due to the changing path lengths. However, because the differential propagation delay is only a small fraction of the symbol period, all the frequencies in the signal of interest spectrum are attenuated more or less by the same amount, hence the name flat fading. This kind of fading is present in almost all urban and suburban areas in which multipath propagation is caused by reflections from buildings and natural obstructions.

An example of frequency selective fading would result with the same parameters as above except that the signalling rate is increased to, e.g., 25 ksps. In that case the differential propagation delay is 25% of the symbol period and results in major degradation in the performance of the receiver due to time dispersion, i.e., smearing of the received signal pulses. Time dispersion causes intersymbol interference (ISI); that is, the signal at the decision points as viewed by the receiver is made up of a superposition of contributions from multiple symbols. Hence if the receiver attempts to make a decision based upon a single received symbol, i.e., without any further processing, its performance will degrade severely since adjacent symbols will interfere with the symbol on which the receiver is making a decision.

Digital adaptive equalizers are widely used to combat the effect of time dispersion in high speed communication channels. Equalization has been used for many years in high speed data modems over analog telephone lines. The introduction of high speed digital transmission over cellular and other radio channels has mandated the use of equalization or other similar techniques that can counteract the effects of time dispersion. The equalization problem in the mobile radio channel, however, is considerably more complex than that in telephone channels, mainly because the channel impulse response in the mobile radio channel is time variant and must be estimated by the receiver in real time. Thus the receiver must not only make decisions based upon the received signal, it must also adapt the equalizer parameters in response to the fast-changing channel conditions.

As fading rate approaches the TDMA block rate, both deep energy fading and minimum-to-maximum phase channel response transitions frequently occur in a frame duration, which result in a significant number of equalizer loss-of-locks. Since most equalizers have difficulty recovering from loss-of-lock, this greatly degrades the receiver performance and has raised worldwide interest. The phenomenon is especially pronounced in narrow band TDMA systems in a mobile, as opposed to portable or indoor, environment.

FIG. 1 depicts the processing performed by a Decision Feedback Equalizer (DFE). The DFE has a forward section 1 comprising a tapped delay line fed by samples of the received complex baseband signal and a feedback tapped delay line 3 fed by the output of a decision circuit 5. The input of the decision circuit is given by the equation $$\hat{I}_k = \sum_{j=-K_1}^{0} c_j v_{k-j} + \sum_{j=1}^{K_2} c_j \tilde{I}_{k-j} \quad (1)$$

where $v_{k-j}$ represents samples of the received signal, $c_j$ represents the weights of the equalizer taps, $\tilde{I}_{k-j}$ represents the signal decisions made by the decision circuit, and $K_1+1$ and $K_2$ represent the respective number of forward and feedback taps. The forward section may be either synchronous, i.e., clocked at the rate of one sample per received symbol, or fractionally-spaced, i.e., clocked at multiple (typically 2) times for each received symbol. The latter is the preferred approach since it provides sampling timing insensitivity, a significant advantage in a highly dispersive time-variant environment.

The adaptation of the DFE tap weights in an environment where their optimal values change significantly within a given time slot is the subject of the present invention. Fast adapting algorithms have been published in the technical literature and are generally of the Recursive Least Square (RLS) type. Several different variants (e.g., direct Kalman, Square-root Kalman, Lattice filter, MSE Lattice) may be used with the enhanced adaption method described below.

The adaption method known as the direct form Kalman update algorithm comprises a gain update section and a tap update section. The tap update section, described by equation 6 below, is similar to more widely used techniques derived through MSE-criterion based methods, except that the gain is a vector with a length equal to the equalizer length (sum of the number of forward and feedback section taps), rather than a single scaler parameter adjusted through experimentation. Moreover, the gain is calculated in real time based on the received signal samples. The equations governing these updates are summarized below:

Compute output:
$$\hat{I}_N(t) = Y_N(t)C_N(t-1) \quad (2)$$

Compute error:
$$e_N(t) = \tilde{I}_N(t) - \hat{I}_N(t) \quad (3)$$

Compute Kalman gain vector:

$$P_N(t-1)Y^*{}_N(t) \quad (4)$$

$$K_N(t) = \frac{}{w + Y_N(t)P_N(t-1)Y'{}_N(t)}$$

Update inverse of the correlation matrix:

$$P_N(t) = \frac{1}{w}[P_N(t-1) - K_N(t)Y_N(t)P_N(t-1)] \quad (5)$$

Update coefficients:

$$\begin{aligned}C_N(t) &= C_N(t-1) + K_N(t)e_N(t) \\ &= C_N(t-1) + P_N(t)Y^*(t)e_N(t)\end{aligned} \quad (6)$$

See J. Proakis, *Digital Communications,* McGraw Hill, 1989.

At the beginning of each TDMA slot in the Kalman technique the equalizer tap weights are all set to zero and the equalizer is trained, that is, the initial tap weight estimates are calculated. The tap weight calculations use a sync sequence sent by the transmitter and known in advance by the receiver. During the training period, the sync word symbols replace the decision symbols produced by the decision circuit and the adaptation algorithm described above is executed to generate updates of the tap weights, as described in equation 6. If the sync word is sufficiently long (e.g., greater than two times the equalizer length), the tap weights are adjusted to their correct values at the end of the training period, at which point the equalizer is ready to generate decisions based upon the received signal.

Processing of the signal in the reverse order from which it was received was recently introduced as a means of improving receiver performance under certain dispersive multipath conditions. A reverse processing algorithm is described in S. Ariyavisitakul, "Equalization of a Hard-Limited Slowly-Fading Multipath Signal Using a Fade Equalizer With a Time-Reversal Structure," 40th IEEE Vehicular Technology Conference, pages 520 to 526, May, 1990. That and other known algorithms, however, are incapable of working in an environment where there is a high probability of deep fade and minimum-to-maximum phase transition within a block duration. The known algorithms assume that the channel dispersion is fixed in a block duration and can be classified as either minimum phase or maximum phase. They choose either forward or reverse processing once per block by simply looking at the equalizer training status.

A TDMA communication system with adaptive equalization for reducing multipath propagation distortion is described in U.S. Pat. No. 4,852,090, which issued Jul. 25, 1989 and which is hereby incorporated by reference into the instant application. The reader is referred to the '090 patent for further background on the present invention.

SUMMARY OF THE INVENTION

A major goal of the present invention is to provide improved methods and apparatuses for reducing multipath propagation distortion.

Methods for reducing multipath propagation distortion in a signal in accordance with the present invention comprise the steps of sampling the signal to obtain a plurality of sampled symbols, equalizing the time delay characteristics of at least a first subset of the said sampled symbols by processing the first subset in a first direction until a first prescribed condition is detected, and equalizing the time delay characteristics of at least a second subset of the said sampled symbols by processing the second subset in a second direction until a second prescribed condition is detected.

In a preferred embodiment of the invention the first and second subsets comprise values from a data block that is bounded by first and second synchronization words.

Another embodiment of the invention further comprises the step of equalizing the time delay characteristics of a third subset of the sampled values by processing a first portion of the third subset in the first direction at least until a predefined point between the first and second subsets is reached and processing a second portion of the third subset in the second direction at least until the predefined point is reached.

In still another embodiment of the invention the predefined point is the midpoint between the first and second subsets.

In yet another embodiment of the invention the first and second prescribed conditions are detected by determining the mean square error (MSE) in the received symbols following equalization and determining when the MSE exceeds a predefined limit.

In another embodiment of the present invention the first condition is detected by detecting when the MSE exceeds the predefined limit over a first predefined majority of a first set of symbols and the second condition is detected by detecting when the MSE exceeds the predefined limit over a second predefined majority of a second set of symbols.

In still a further embodiment of the invention the equalizing steps employ a decision feedback equalization algorithm.

The present invention also encompasses methods for operating a communications system comprising the steps of interleaving a plurality of predefined synchronization words with a plurality of data words to form a user signal, transmitting the user signal, receiving the transmitted user signal, and processing the received user signal to reduce multipath propagation distortion by performing the steps of sampling the signal to obtain a plurality of sampled symbols, equalizing the time delay characteristics of at least a first subset of the sampled symbols by processing the first subset in a first direction until a first prescribed condition is detected, and equalizing the time delay characteristics of at least a second subset of the sampled symbols by processing the second subset in a second direction until a second prescribed condition is detected.

The present invention also encompasses apparatuses that comprise means for sampling a signal to obtain a plurality of sampled symbols, means for equalizing the time delay characteristics of at least a first subset of the sampled symbols, including means for processing the first subset in a first direction until a first prescribed condition is detected, and means for equalizing the time delay characteristics of at least a second subset of the sampled symbols, including means for processing the second subset in a second direction until a second prescribed condition is detected.

Another embodiment of the present invention provides an apparatus for reducing multipath propagation distortion in a sampled time domain signal that comprises a plurality of symbols, wherein the symbols comprise time delay characteristics. The apparatus comprises detector means for detecting a first prescribed condition among the said symbols; first means for equalizing the time delay characteristics of the symbols according to a first sequence; second means for equalizing the time delay characteristics of the symbols according to a second sequence; and select means, responsive to the detector means, for selectively storing the respective outputs of the first and second means.

In a preferred embodiment the detector means includes means for detecting a loss of lock condition and the select means includes means for storing outputs of the second means upon the detection of the loss of lock condition.

DETAILED DESCRIPTION OF A PREFERRED EMBODIMENT

Figure 2:
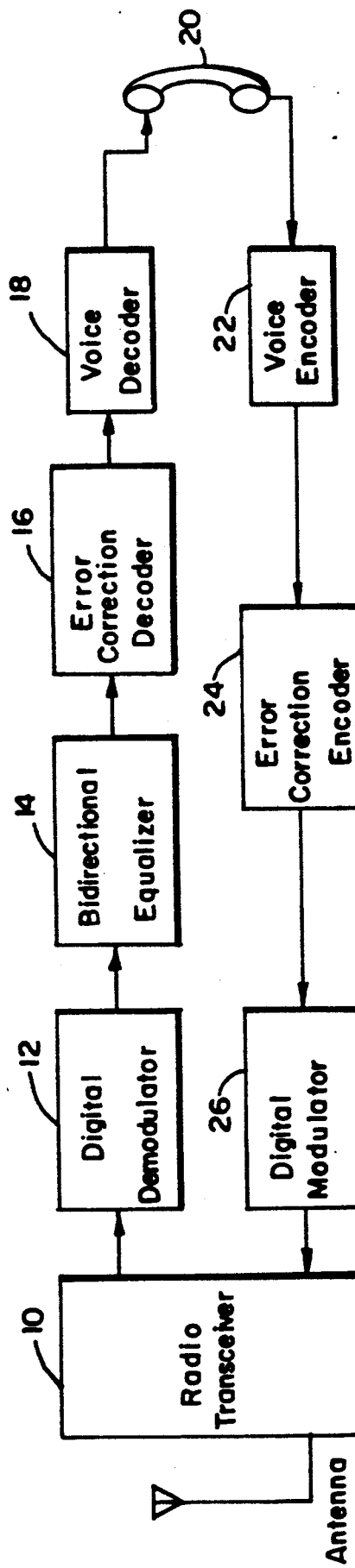
FIG. 2 is a block diagram of a digital cellular telephone in accordance with the present invention.

FIG. 2 is a block diagram of a digital cellular telephone system, which is the preferred environment for the present invention. The cellular telephone system includes a radio transceiver 10, a digital demodulator 12, a bidirectional equalizer 14 (which is described in greater detail below), an error correction decoder 16, and a voice decoder 18, which are all coupled to the speaker portion of a handset 20. The system further comprises, coupled to the microphone portion of the handset 20, a voice encoder 22, error correction encoder 24 and digital modulator 26. The bidirectional equalizer 14 processes the demodulated digital signal to minimize the effect of multipath propagation.

Figure 3:
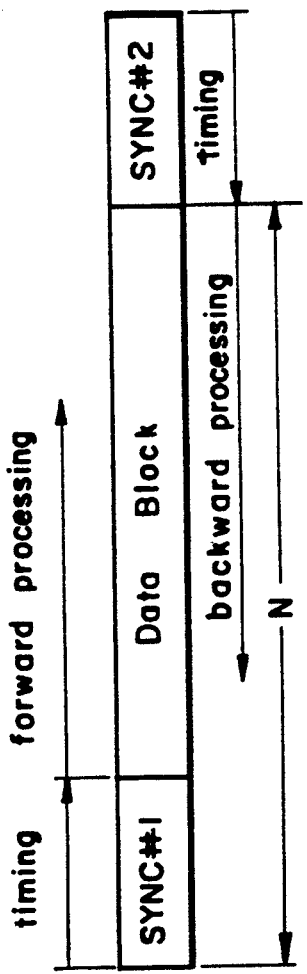
FIG. 3 depicts the structure of a TDM/TDMA time slot.

FIG. 3 illustrates the structure of a TDM/TDMA signal block to be processed in accordance with the present invention. The signal block includes a plurality of synchronization words (SYNC #1, SYNC #2) interleaved with corresponding data blocks. A single user message is made up of a synchronization word and the data block that follows that synchronization word and is made up of N symbols. In a preferred embodiment, there are 14 synchronization symbols and 148 data symbols per user message, which is in accordance with the North American Digital Cellular (NADC) system. At 2 bits per symbol, the number of bits per user message is equal to 296 under the NADC system. The individual cellular telephone units are programmed to look for a particular synchronization word and to decode only the data blocks (i.e., messages) preceded by that synchronization word. The present invention employs both the preceding and trailing synchronization words in performing the equalization function.

Figure 4:
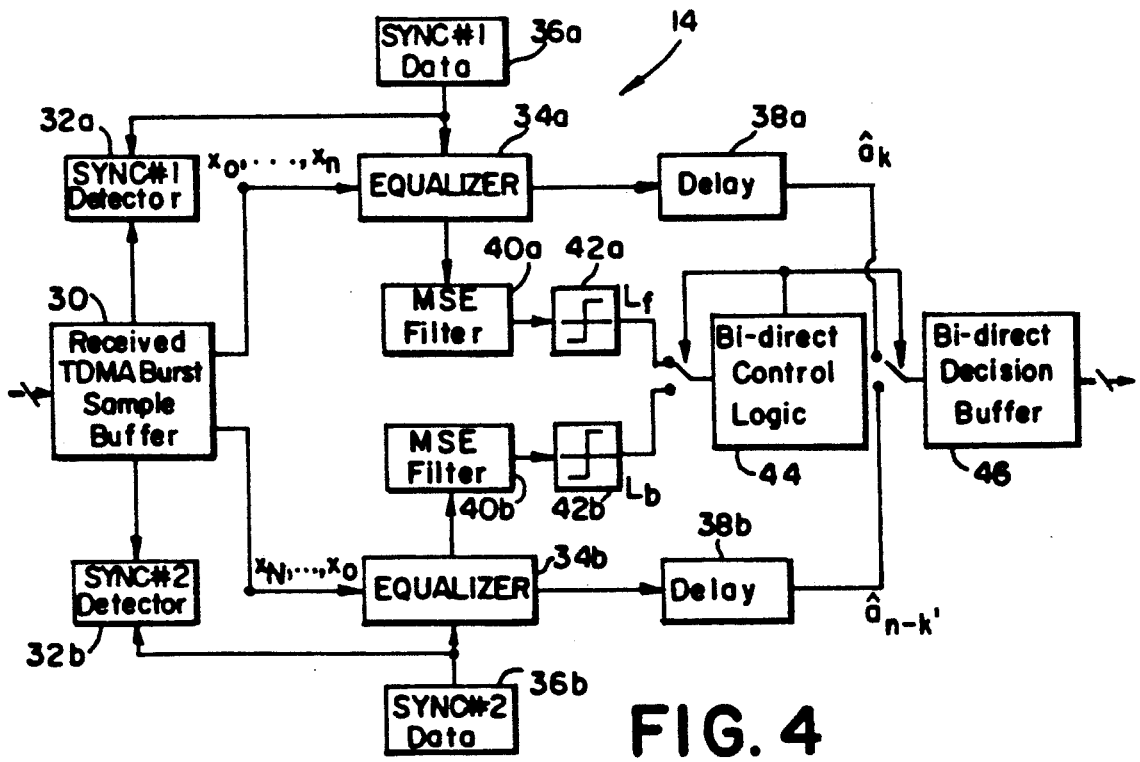
FIG. 4 is a block diagram of a bidirectional equalizer in accordance with the present invention.

FIG. 4 is a block diagram of the bidirectional equalizer 14 of FIG. 2. It should first be noted that the equalizer 14 is symmetrical and comprises a forward processing branch and a backward processing branch. At the center is a sample buffer 30 wherein received TDMA burst samples are temporarily stored.

The forward processing branch comprises the following components:

1. A synchronization word detector block 32a that detects the presence in the received signal of a first prescribed sync word (e.g., SYNC #1) by comparing the stored samples with a value stored in memory 36a.

Figure 1:
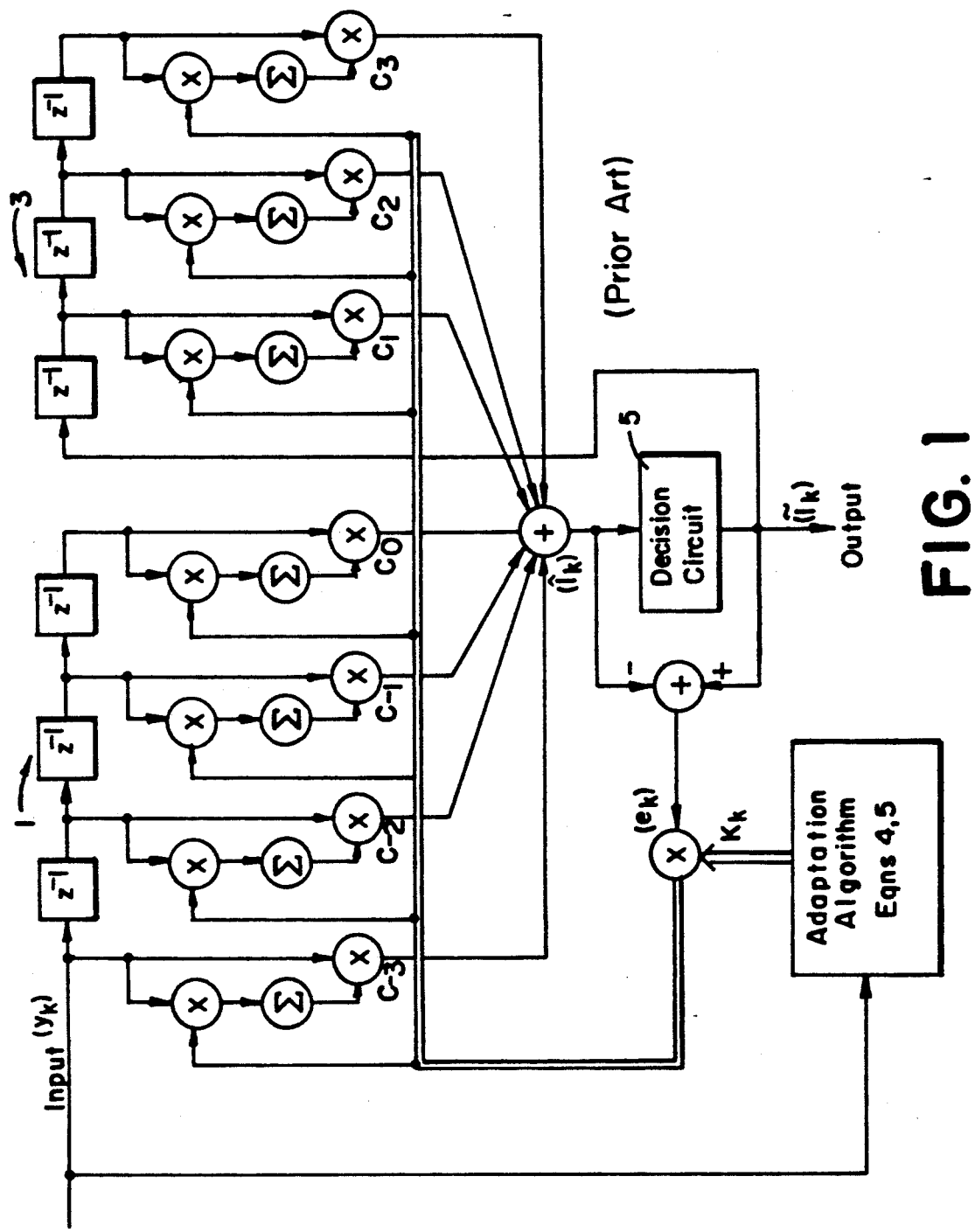
FIG. 1 is a block diagram of a Decision Feedback Equalizer.

2. The sync data word memory 36a.
3. A first equalizer 34a for processing the N symbols of each user message intended for the given telephone unit. This is described in greater detail below.
4. A delay block 38 a that compensates for the delay through the MSE filter 40a, 40b and the bidirectional control logic 44 in accordance with the MSE filter memory.
5. A mean square error (MSE) filter 40a that generates an estimate of the mean square error, i.e., computes the average of the squared differences between the respective symbols at the input and output of a decision circuit such as the decision circuit 5 of FIG. 1.
6. A loss-of-look detector 42a that declares equalizer loss-of-lock (the term loss-of-lock indicates that the signal physically changes too fast or by too large an amount for the equalizer to respond properly). In one embodiment of the invention the loss-of-lock detector compares the MSE computed by block 40a with a predefined threshold value (e.g., 0.35 assuming the signal decision points have been normalized to 1) and outputs a loss-of-lock signal $L_f$ if the MSE exceeds the predefined threshold value. In another embodiment of the invention the detector compares the MSE to the threshold over a set (such as five) of past symbols and declares loss-of-lock only if the MSE exceeds the threshold in the majority of symbols in that set.
7. Bidirectional control logic 44 (described below).
8. A bidirectional decision buffer 46.

The backward processing branch comprises a detector 32b for detecting the trailing sync word (SYNC #2) a memory 36b for storing the trailing sync word, an equalizer block 34b (described below), a delay block 38b, MSE filter 40b, and loss-of-lock detector 42b.

Figure 5:
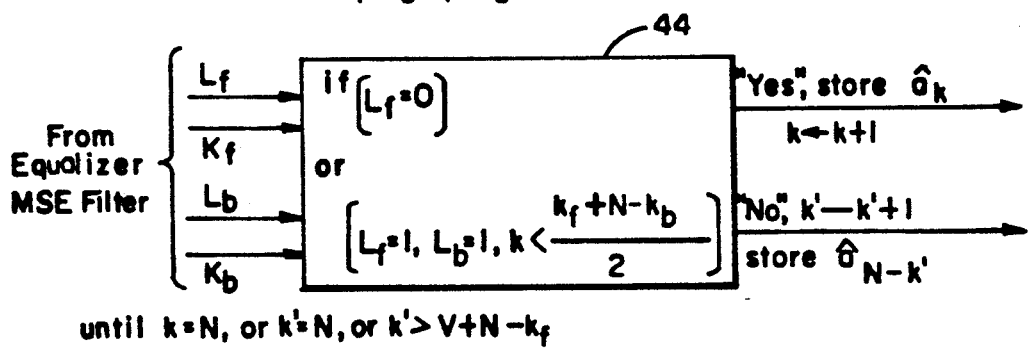
FIG. 5 is a more detailed depiction of the bidirectional control logic block (44) of FIG. 4.

FIG. 5 depicts the operation of the bidirectional control logic 44. That logic receives the signals $L_f$ and $L_b$ from detectors 42a and 42b, respectively, and also receives two other signals, $K_f$, $K_b$. As explained below, $K_f$ and $K_b$ are initialized to zero and are set to the values of the respective running indices at the points where a loss-of-lock condition is declared. (The operation of the bidirectional control logic 44 is described in detail below in connection with the flow diagrams of FIGS. 6-9). The symbol value $â_k$ is stored in buffer 46 if either $L_f=0$, which indicates that no loss-of-lock condition has occurred with respect to the first sync word (SYNC #1), or if both $L_f$ and $L_b=1$ and $$k < \frac{K_f + N - K_b}{2}.$$

(Note that the value $$\frac{K_f + N - K_b}{2}$$

represents the index k at the midpoint between $K_f$ and $K_b$.) If none of the above conditions is satisfied, the symbol $â_{N-k'}$ is stored in buffer 46. This operation continues until k=N, k'=N or $k' > V + N - K_f$, where V is an overlap parameter that depends on the MSE memory. For example, V is set to ten for an MSE filter with memory of six symbols (which is the preferred embodiment).

Figure 6:
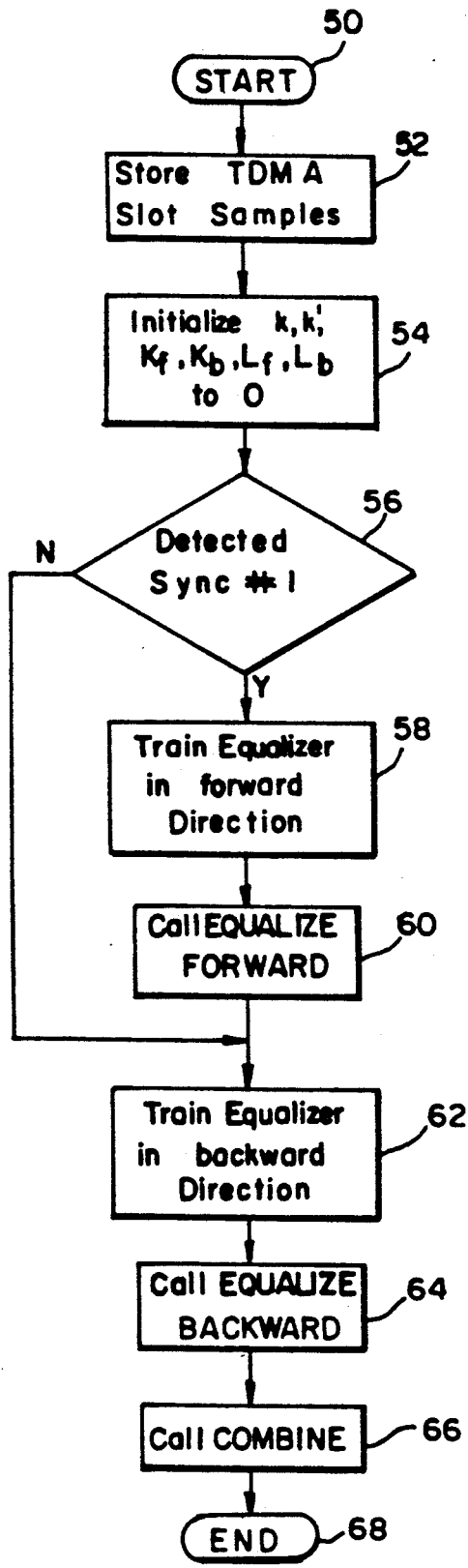
FIG. 6 is a flow chart of a bidirectional equalization algorithm in accordance with the present invention.
Figure 7:
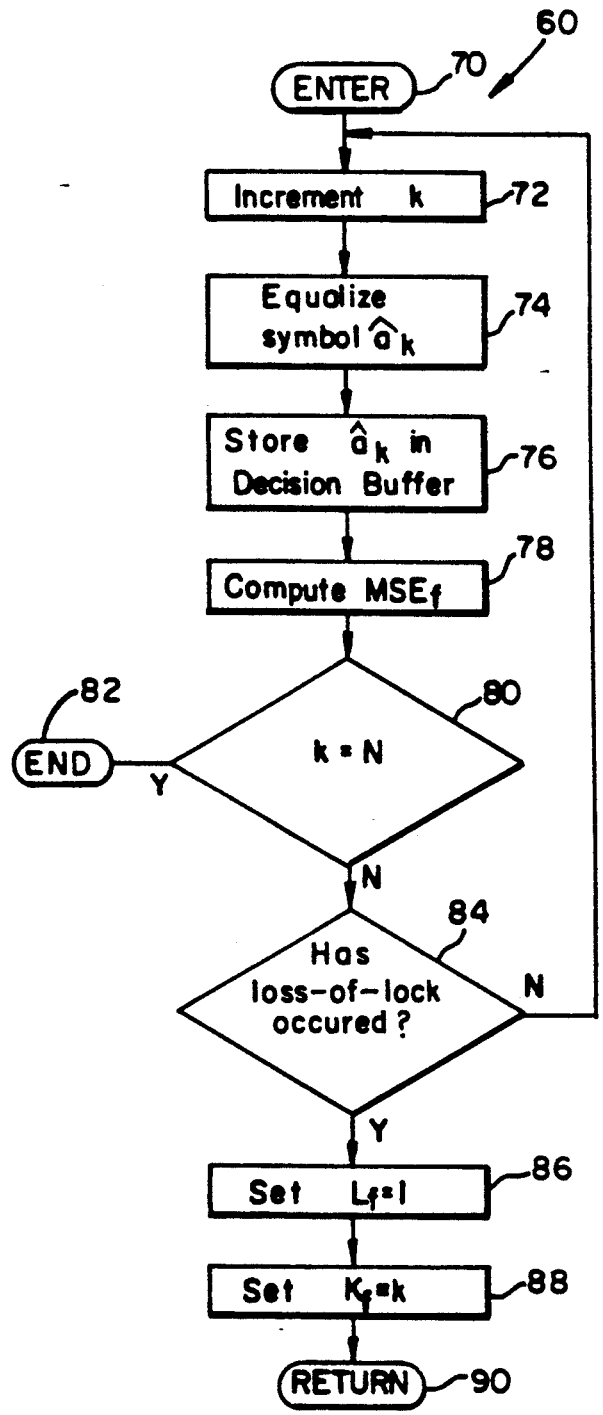
FIG. 7 is a flow chart of the EQUALIZE FORWARD block (60) of FIG. 6.
Figure 8:
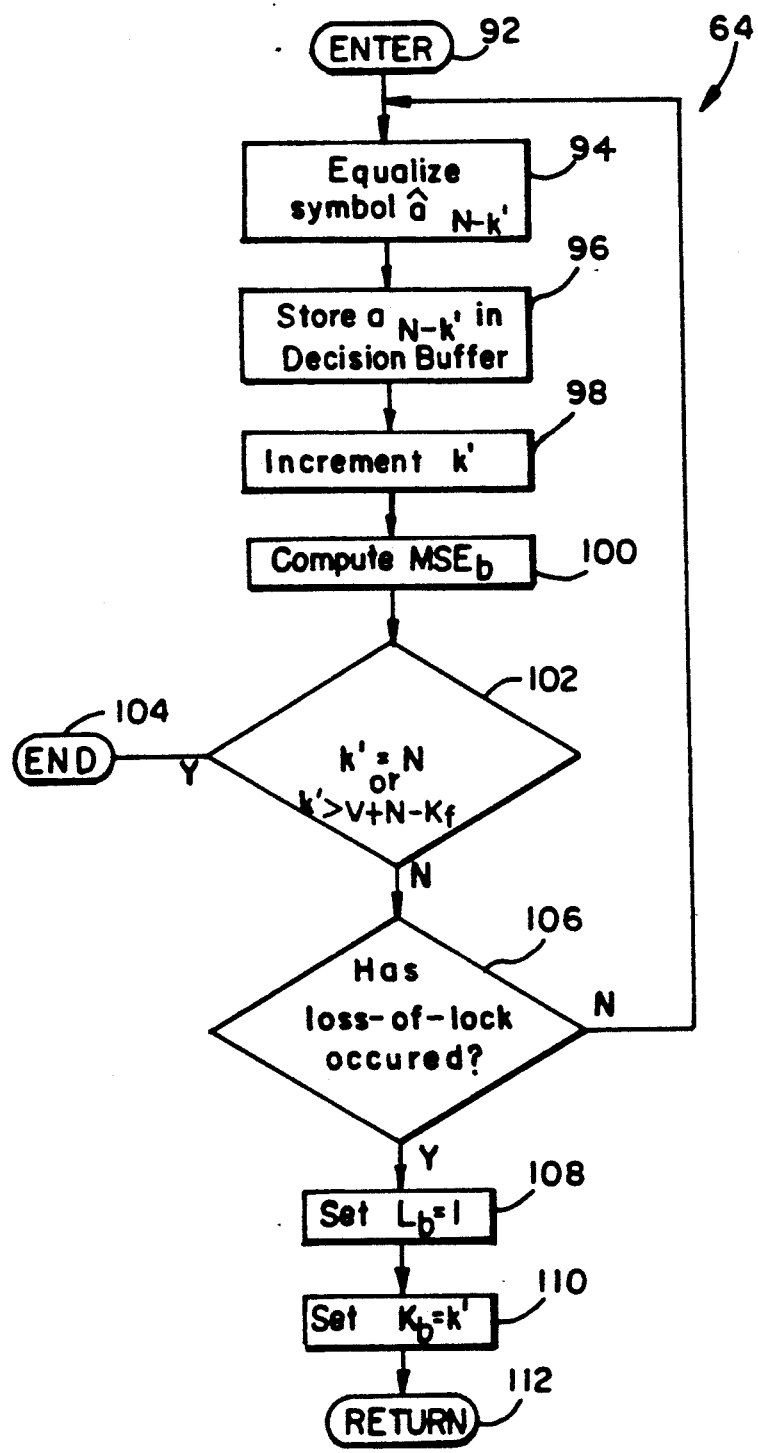
FIG. 8 is a flow chart of the EQUALIZE BACKWARD block (64) of FIG. 6.
Figure 9:
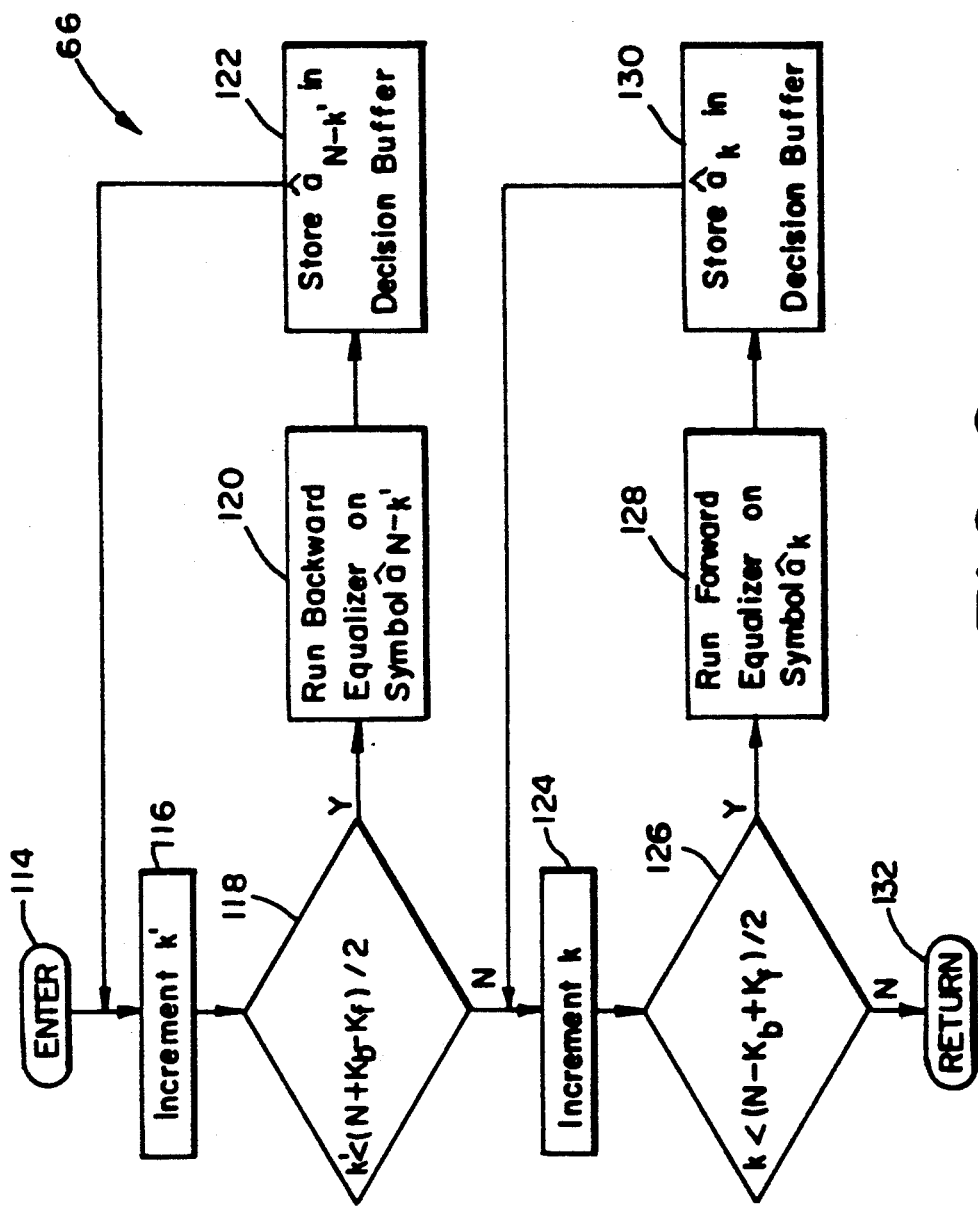
FIG. 9 is a flow chart of the COMBINE block (66) of FIG. 6.

A flow chart of a computer program embodying the bidirectional equalization algorithm is depicted in FIGS. 6-9. Source code used in verifying the algorithm is listed in the appendix. FIG. 6 is a flow chart of a main program (MAIN) and FIGS. 7-9 are flow charts of subroutines invoked by the main program.

The main bidirectional equalization algorithm is started at step 50.

Next, a predefined number of TDMA slot samples are stored, step 52.

Next, the indices k, k', $K_f$, $K_b$, $L_f$, $L_b$ are set to 0, step 54.

At decision step 56, a determination is made of whether the first sync word (SYNC #1) has been detected.

If SYNC #1 has been detected, the equalizer is trained in the forward direction, step 58.

Next, at step 60 the EQUALIZE FORWARD subroutine is called.

After returning from the EQUALIZE FORWARD subroutine, or if SYNC #1 was not detected at decision block 56, the equalizer is trained in the backward direction, step 62.

The EQUALIZE BACKWARD subroutine is called at step 64.

The COMBINE subroutine is called at step 66 after the EQUALIZE BACKWARD subroutine is executed. The COMBINE subroutine combines the results of the EQUALIZE FORWARD and EQUALIZE BACKWARD subroutines, as explained below.

The main program stops at step 68.

Referring to FIG. 7, the EQUALIZE FORWARD subroutine is entered at step 70.

The index k is incremented at step 72.

At step 74 the symbol $â_k$ corresponding to index k is equalized.

At step 76 $â_k$ is stored in the decision buffer 46.

At step 78 the mean squared error $MSE_f$ is computed.

At decision step 80 a determination is made of whether k is equal to N.

The program ends if k is equal to N, step 82.

If k is not equal to N, a determination is made at step 84 of whether $MSE_f$ is greater than a threshold value (e.g., 0.35 or 35% of the signal decision points).

The program loops to step 72 if no loss-of-lock has been detected (e.g., if $MSE_f$ is not greater than the threshold value).

If $MSE_f$ is greater than the threshold value, the variable $L_f$ is set equal to 1, step 86, the index $K_f$ is set equal to k, step 88, and control is returned to the main program, step 90.

Referring to FIG. 8, the EQUALIZE BACKWARD subroutine is entered at step 92.

At step 94 the symbol $â_{N-k'}$ is equalized.

At step 96 $â_{N-k'}$ is stored in the decision buffer 46.

At step 98 the index k' is incremented.

At step 100 the reverse mean square error ($MSE_b$) is computed.

At decision step 102 a determination is made of whether k' is equal to N or k' is greater than $V+N-K_f$.

If k' is equal to N or greater than $V+N-K_f$ the program ends, step 104.

If k' is not equal to N or greater than $V+N-K_f$ a determination is made at step 106 of whether $MSE_b$ is greater than the threshold value. If it is not, the program loops to step 94.

If $MSE_b$ is greater than the threshold value the variable $L_b$ is set equal to 1, step 108, the index $K_b$ is set equal to k', step 110, and control is returned to the main program, step 112.

Referring to FIG. 9, the subroutine COMBINE is entered at step 114.

At step 116 k' is incremented.

At decision step 118 a determination is made of whether K' is less than $(N+K_b-K_f)/2$.

If k' is less than $(N+K_b-K_f)/2$, the backward equalizer is run on the symbol $â_{N-k'}$, step 120, $â_{N-k'}$ is stored in the decision buffer 46, step 122, and the program loops to step 116.

If k' is not less than $(N+K_b-K_f)/2$, k is incremented, step 124, and a determination is made at step 126 of whether k is less than $(N-K_b+K_f)/2$.

If k is less than $(N-K_b+K_f)/2$, the forward equalizer is run on symbol $â_k$, step 128, symbol $â_k$ is stored in the decision buffer 46, step 130, and the program loops to step 124.

If at decision step 126 k was greater than or equal to $(N-K_b+K_f)/2$, control is returned to the main program, step 132.

In summary, for every TDMA block the receiver operation starts with the forward processing procedure and operates on received samples in a first-in first-served order. The sync word detector 32a ensures the correct TDMA frame timing and starts the equalizer training. The detected data is stacked in the decision buffer 46. The adaptive equalizer 34a outputs the decision error signal, which is squared, filtered and threshold-compared to generate a latch-type loss-of-lock flag. Without loss-of-lock, the receiver works through to the last data symbol and the frame processing is finished. The forward processing is halted and the receiver switches to the backward processing branch (FIG. 4) if the receiver loses lock midway through the data block. The backward processing branch processes received samples from the input buffer in reverse order. The sync word detector 32b detects the reverse trailing sync word (SYNC #2) and recovers the TDMA symbol timing. The receiver then trains the equalizer and starts data processing in a reverse mode. The detected data is then stacked in the decision buffer 46, starting from the Nth symbol. The reverse loss-of-lock detector works the same as the forward loss-of-lock detector. The control logic, however, is modified such that backward processing works until either detected data overwrites a portion of the forward-processed data, or a loss-of-lock is declared. In the former case, the frame processing is finished. In the latter case, the midpoint between the two loss-of-lock points is calculated and, if needed, both processes are enabled toward the midpoint. The overlap in processing is required to cover the delay and uncertainty range of lock detections, so the overall performance is optimized.

An important aspect of the present invention is that the channel condition is detected from the equalizer tracking status, and the dividing point between forward and backward processing is optimized in an adaptive manner such that overhead is minimized and the effect of loss-of-lock is removed. The equalizer MSE estimate has been shown in computer simulations to be very reliable in reflecting the equalizer loss-of-lock status.

It should be noted that some of the methods cited in the background of the invention section of the instant application are much simpler than the algorithm of the present invention, however they are incapable of working in a fast fading environment where the probability of deep fade and minimum-to-maximum phase transitions inside a block is high. Those algorithms assume that the channel dispersion is fixed in a block duration and can be classified as either minimum phase or maximum phase In contrast, the present invention is based on the assumption of a highly dynamic channel that could change greatly within a block duration The algorithm of the present invention adapts in symbol resolution by utilizing the equalizer tracking status, which is a major reason why the bidirectionally-combined processing has significant advantages over the prior art.

The primary advantages offered by the present invention are that the error rate is greatly reduced, the modem maximum operational fading rate is increased by a factor of two and the efficiency can be increased above the efficiency achievable by using four training sequences per TDMA block. Further, the algorithm of the present invention will work on both TDM and TDMA signals with sub-frame structures that have one leading and one trailing sync word.

Finally, it should be noted that the present invention is not limited to the specific embodiments described above, as many variations of those embodiments will be within the true scope of the following claims. For example, a maximum likelihood sequence estimation (MLSE) algorithm or other known time dispersion mitigation technique could be used instead of the DFE in the above-described embodiments.

APPENDIX

```
C===========================================================
C NAME:    MCSS for TDMA Digital Cellular Modem using pi/4 QPSK scheme
C PURPOSE:    Bi-directional Error Counter
C           simulate the performance of pi/4 QPSK modulation in
C           a frequency selective multipath Rayleigh fading channel
C
C DATE:    modified at 1/9/90 from MCSS7.SUN to DCELL.FOR
C           modified at 4/1/90 from DCELL.FOR to BIDCELL.FOR
C CALL:    ViterB.

PROGRAM MAIN

PARAMETER   (LSLOT9x= 640)

C===========================================================
C   Statistic Variables:

REAL     Pb, Ps, Pes, PeBlk, Peres, SNRdB, JSRdB
```

```
C==============================================================
C     System Variables:

INTEGER    iADet(LSLOT9x), jADet(LSLOT9x), Hstgrm(LSLOT9x),
     *           HstgrmV(LSLOT9x)
      CHARACTER  FName*64, FNameV*64, DOCLine*255

C ***** Simulation information:

PRINT *, '#Frames/Run, SymBols/Frame, iBpS,',
     *         ' and #Frame/Report:'
      READ *, Itimes, LSLOTr, iBpS, jumRpt
      jumRpt= MIN(Itimes, MAX(jumRpt, 0))
      PRINT '(1x, 5I5)', Itimes, LSLOTr, iBpS, jumRpt
      iBpSr= iBpS PRINT *, 'Combining Algorithm #:'
      READ *, IsComb
      PRINT *, IsComb PRINT *, '# Initial DOC Lines, Tail DOC Lines, IsDbg?'
      READ *, nINIT, nTAIL, IsDbg
      PRINT *, nINIT, nTAIL, IsDbg
      IF (IsDbg.LT.0) THEN
          NoHistogram=1
          IsDbg= 0
      ELSE
          NoHistogram=0
      ENDIF PRINT *, 'Forward processed BER file:'
      READ *, FName
      PRINT *, FName PRINT *, 'Backward processed BER file:'
      READ *, FNameV
      PRINT *, FNameV C==============================================================
C      Input BER file format:
C
C Line # in FILE      Line Contents       iVAR
C ----------------    -------------       -------
C 1                   Init line 1           1
C ...                 ...
C nINIT               Init. line nINIT
C nINIT+1             Frame #1
C ...                 ...
C nINIT+nTIMESr       Frame #n
C nINIT+nTIMESr+1     Tail line 1
C ...                 ...
C ITimes              Tail line nTAIL       1
C ITimes+1            Init line 1           2
C ...                 ...               ...(same structure as iVAR=1)
C 2*ITimes            Tail line nTAIL       2
C 2*ITimes+1          Init line 1           3
C ...                 ...               ...(same structure as iVAR=1)
C 3*ITimes            Tail line nTAIL       3
C ...

iDev= 16
      jDev= 17
      OPEN (iDev, FILE=FName, STATUS='OLD')
      OPEN (jDev, FILE=FNameV, STATUS='OLD')

C==============================================================D
C ******************** Start of the simulation loop: ********************D
C==============================================================D C Note: TDMAStat requires itime to be >= 1.

iVAR= 0
9000  nTIMESr= 0
      iVAR=iVAR+1
      Pb= 0.0
      Ps= 0.0
      Percs= 0.0
      PeBlk= 0.0

DO 9010 i=1,LSLOTr
          HstgrmV(i)= 0
          Hstgrm(i)= 0
9010  CONTINUE
```

```fortran
      DO 10000 itime= 1-nINIT, Itimes+nTAIL

C***** Rc loop #iVAR:

IF ((itime.LE.0).OR.(itime.GT.Itimes)) THEN
         READ (iDev,*,END=12000) DOCline
         PRINT *,'IN:',DOCline
         READ (jDev,*,END=12000)
         PRINT *,'OT:',DOCline
         GOTO 10000
      END IF READ (iDev,'(1x,512Z1)',END=10001) (iADet(i),i=1,LSLOTr)
      IF (IsDbg.NE.0) PRINT '(1x,512Z1)',(iADet(i),i=1,LSLOTr)
      READ (jDev,'(1x,512Z1)',END=10001) (jADet(i),i=1,LSLOTr)
      IF (IsDbg.NE.0) PRINT '(1x,512Z1)',(jADet(i),i=1,LSLOTr)

CALL BERCnt2 (iADet, jADet, LSLOTr, iPs1,
     *      iPes1, iPeres, Pb, iBpS, iVAR,
     *      iErrWr, IsComb, IsDbg, HstgrmV)

IF (IsDbg.NE.0) PRINT '(1x,512Z1)',(jADet(i),i=1,LSLOTr)

IF (iPs1.NE.0) THEN
         Ps= Ps+iPs1
         Peres= Peres+iPeres
         PeBlk= PeBlk+1.0
         Hstgrm(iPs1)= Hstgrm(iPs1)+1
      END IF
      IF (iPes1.NE.0) Pes= Pes+iPes1
      nTIMESr= nTIMESr+1

IF (jumRpt.NE.0) THEN
         IF (MOD(nTIMESr, jumRpt).EQ.0) THEN
            PRINT '(1x, A, I3, I6, 3I4, 3F10.0)',
     *         'STAT=', iVAR, nTIMESr, iPs1, iPes1, iPeres,
     *         Pb, Ps, PeBlk
         END IF
      END IF C==========================================================
C     End of one Frame

10000 CONTINUE

C==========================================================
C     Final Report:
C     1. Channel Error Report: (for short simulation)
C     2. BER report.
C     3. Histograms of Error Position and Burst Pattern 10001 IF (nTIMESr.EQ.0) goto 12000
      tmp= 1.0/nTIMESr
      PRINT *,'SNR=    JSR=    Pb=       Ps=      ',
     *      'PeBk=    #Err_Blocks Erase_Ratio'
      tmp2= 1e30
      IF (Pes.NE.0.) tmp2= Peres/Pes
      PRINT '(1x, 2F6.1, 6(E12.4))', SNRdB, JSRdB, Pb*tmp/
     *      LSLOTr/iBpSr, Ps*tmp/LSLOTr, PeBlk*tmp,
     *      PeBlk, tmp2

PRINT '(1x,A,3I6)','# BER/DATA/WANTED Frames= ',nTIMESr,
     *      itime-1-MAX(nTAIL,itime-1-nTIMESr), ITimes C==========================================================
C     Histogram Report:

IF (NoHistogram.NE.0) GOTO 9000

PRINT '(1x,A,/,99(16I4,/))','Histogram of #SER per position:',
     *      (HstgrmV(i),i=1,LSLOTr)
      itmp= 0
      DO 10010 i=1,LSLOTr/2
10010 itmp=itmp+HstgrmV(i)
      itmp2=itmp
      itmp= 0
      DO 10020 i=LSLOTr-(LSLOTr/2)+1,LSLOTr
10020 itmp=itmp+HstgrmV(i)
      PRINT *,'First & Last ',LSLOTr/2,' positions have #ber=',itmp2,itmp PRINT '(1x,A,/,99(16I4,/))','Histogram of #SER per frame:',
     *      (Hstgrm(i),i=1,LSLOTr)
```

```
C==============================================================
C     End of one iVAR loop

GOTO 9000

C==============================================================
C     End of DATA file -- exit at the end of file.

12000 CONTINUE

STOP
      END

C==============================================================
C NAME:    BERCnt
C PURPOSE: LOG2(Nalpha) bits error detector and symbol error counter
C          with bi-directional detection-combining for Multi-path fading
C          channel (modified from BERCNT at 4/1/90 cms)
C INPUT:   ia(L), iaV(L): the input data sequences;
C          iVAR:    the output file order;
C          iBps:    #Bits per Symbol.
C OUTPUT:  iPs,iEs,iErEs  #Err Symb, #Erased Symb, and #both
C          Pb       accumulated #Error Bits;
C          iWrite   reflect the status of output file FORT6?;
C          iaV(.)   modified to contain the new error pattern.
C          FORT6?   contains the packed bit error pattern in
C                   Octal/Hex format, where erasure bit marks
C                   can also be stored.
C CALL:    BtPack SUBROUTINE BERCnt2(ia,iaV,L,iPs,iEs,iErEs,Pb,iBpS,iVAR,
     *                   iWrite,IsComb,IsDbg,HstgrmV)
      PARAMETER  (NsMax=64, MaxBlk=512)
      DIMENSION  iaV(L), ia(L)
      INTEGER    iErOct(MaxBlk), HstgrmV(L)
      CHARACTER  iyn
      CHARACTER*50  CombType(0:8)
      LOGICAL    iWrite
      DATA       iff, iErDev, iBpOct/1,60,4/
      DATA       CombType/
     *   'Foreward processing only (ia).                    ',
     *   'Switch to iaV after ia lose-lock.                 ',
     *   'Switch to iaV after loss-lock w/ Nlimit overlays. ',
     *   'Switch to iaV after loss-lock w/o back limit.     ',
     *   'As Type 2, but no combination if ia is fine.      ',
     *   'As Type 3, but conditioned if ia or iaV is ideal. ',
     *   'Also consider semi-loss-lock in both sides.       ',
     *   'Half-slot fixed combining.                        ',
     *   'Backword processing only.                         '/
C         '0123456789012345678901234567890123456789012345678 9'

IF (iff.NE.0) THEN
         iff=0
         PRINT *,'Write Octal/Hex error pattern to "FORT6x" ? (y/n/h)'
         READ '(A1)',iyn
         PRINT *,iyn
         iWrite=((iyn.EQ.'y').OR.(iyn.EQ.'Y'))
         IF ((iyn.EQ.'h').OR.(iyn.EQ.'H')) THEN
            iWrite=.TRUE.
            iBpOct=4
         ELSE IF (iWrite) THEN
            iBpOct=3
         END IF
      END IF
      Nalpha=ISHFT(1,iBpS)
      Nalph1=Nalpha-1
      Nalph2=Nalpha**2
      Nalp2m1=Nalph2-1 iBps2=iBps+iBps
      LOct=L*iBpS2/iBpOct
      IF (LOct*iBpOct.NE.L*iBpS2) LOct=LOct+1
      L2d3=L*2/3

IsComb= MAX(0,MIN(8,IsComb))
      PRINT *,CombType(IsComb)

NMark= 3
      gMark= 0.3
      ThS= 0.65
      Nlimit= 15
```

```
            PRINT *,'# MARKS to detect a loss-of-lock (< 0=filter),'
            PRINT *,'gMark & Threshold for a gMark exp. filter,'
            PRINT *,'Back processing limit (# symbols):'
            PRINT *, NMark, gMark, Th5, Nlimit
            READ  *, NMark, gMark, Th5, Nlimit
            t= 0.0
            w= 1.0
            i= 0
            IF (Th5.GE.0.99)
     *          CALL ERROR('threshold too high!@')
            IF (NMark.LE.0) THEN
C               Test step response is Test(NMark)= 1-(1-gMark)**NMark.
                i= NINT(LOG(1.0-Th5)/LOG(1.0-gMark))
                NMark= i
                IsAvg= 1
            ELSE
                IsAvg= 0
            END IF
            PRINT *, NMark, gMark, Th5, Nlimit
            PRINT *, 'MIN # of Fade-Marks to declare Loss lock= ', NMark

END IF

IF (IsDbg.NE.0) THEN
          PRINT *,'BERCnt:',iVar
          IF (iBpS.LE.3) THEN
              PRINT '(1x,64Z1)',(ia(j),j=1,L)
              PRINT *
              PRINT '(1x,64Z1)',(iaV(j),j=1,L)
          ELSE
              PRINT '(1x,26I3)',(ia(j),j=1,L)
              PRINT *
              PRINT '(1x,26I3)',(iaV(j),j=1,L)
          END IF
      END IF

CALL LossDet(ia,L,Nalpha,NMark,gMark,Th5,IsAvg,iLoss,iLss2,0)
      IF (IsDbg.NE.0) PRINT *,'Forward  loss-of-lock at: ',iLoss,iLss2
      CALL LossDet(iaV,L,Nalpha,NMark,gMark,Th5,IsAvg,jLoss,jLss2,1)
      IF (IsDbg.NE.0) PRINT *,'Backward loss-of-lock at: ',jLoss,jLss2

C==========================================================================
C     Combining Algorithm GOTO (110,120,130,140,150,160,170,180) IsComb C 0 no processing or forward processing only:
100   CALL MOVEA2B(ia,iaV,L,1,L)
      GOTO 199

C 1 detect ia and switch to iaV with no doubt.
110   CALL MOVEA2B(ia,iaV,L,1,iLoss)
      GOTO 199

C 2 detect ia and switch to iaV with Nlimit more back symbols:
120   CALL MOVEA2B(ia,iaV,L,1,MAX((MIN(iLoss,L)+MAX(0,jLoss))/2,
     *          MIN(iLoss,L)-Nlimit))
      GOTO 199

C 3 detect ia and switch back to iaV without back limit:
130   CALL MOVEA2B(ia,iaV,L,1,(MIN(iLoss,L)+MAX(jLoss,0))/2)
      GOTO 199

C 4 As IsComb=2, but make no combination if forward is fine:
140   IF (iLoss.GT.L) THEN
          CALL MOVEA2B(ia,iaV,L,1,L)
      ELSE
          CALL MOVEA2B(ia,iaV,L,1,MAX((MIN(iLoss,L)+MAX(0,jLoss))/2,
     *          MIN(iLoss,L)-Nlimit))
      END IF
      GOTO 199

C 5 As IsComb=3, with more considerations if either forward or backward
C     processing is ideal.
150   IF (iLoss.GT.L) THEN
          IF (jLoss.LT.0) THEN
              CALL MOVEA2B(ia,iaV,L,1,L/2)
          ELSE
              CALL MOVEA2B(ia,iaV,L,1,L)
          END IF
      ELSE IF (jLoss.LT.0) THEN
          CONTINUE
```

```
        ELSE
            CALL MOVEA2B(ia,iaV,L,1,(MIN(iLoss,L)+MAX(0,jLoss))/2)
        END IF
        GOTO 199

C 6 Other method which also counts in other minor fade detections that
C     ditn't pass threshold or NMark criteria.
160     IF (iLoss.GT.L) THEN
            IF (jLoss.LT.0) THEN
                CALL MOVEA2B(ia,iaV,L,1,(iLss2+jLss2)/2)
            ELSE
                CALL MOVEA2B(ia,iaV,L,1,MAX(jLoss,iLss2-1))
            END IF
        ELSE IF (jLoss.LT.0) THEN
            CALL MOVEA2B(ia,iaV,L,1,MAX(jLss2,iLss2-1))
        ELSE
            CALL MOVEA2B(ia,iaV,L,1,(iLoss+jLoss)/2)
        END IF
        GOTO 199
C 7 fixed half-way mixing
170     CALL MOVEA2B(ia,iaV,L,1,L/2)
        GOTO 199
C 8 backward processing only:
180     CONTINUE
        GOTO 199

199     CONTINUE
        iPs=0
        iEs=0
        iPb=0
        iErEs=0
        DO 200 j=1,L
            ia0=iaV(j)
            ia2=iAND(ia0,Nalp2m1)
            iaV(j)=ia2
            ierr=iAND(ia2,Nalph1)
            IF (ia0.GE.Nalpha) iEs=iEs+1
            IF (ierr.NE.0) THEN
                DO 210 i=0,jBpS-1
210                 IF (BTEST(ierr,i)) iPb=iPb+1
                iPs=iPs+1
                IF (ia0.GE.Nalpha) iErEs=iErEs+1
                HstgrmV(j)= HstgrmV(j)+1
            END IF
200     CONTINUE
        Pb=Pb+iPb IF (iWrite) WRITE
     *      (iErDev+iVAR,'(1x,512Z1)') (iaV(i),i=1,L)

RETURN
        END

C=================================================================
C
        SUBROUTINE ERROR(str)
        CHARACTER str(*)

i=1
5       IF ((str(i).EQ.'@').OR.(i.GE.80)) GOTO 10
        i=i+1
        GOTO 5
10      PRINT '(1x,78A1)',(str(j),j=1,i-1)
        STOP
        END C=================================================================
C
C PURPOSE:
C     detect the position of loss-of-lock in 1-L and returns in iLosslock
C     if no loss-of-lock, iLosslock= +/- a large number = +/-10*L SUBROUTINE LossDet(iADet,L,Nalpha,NMark,gMark,Th5,
     *          IsAvg,iLosslock,iLss2,IsRev)

INTEGER iADet(L)
        IF (IsRev.NE.0) THEN
            i0= L
            i9= 1
            i1= -1
            nBack= -NMark
            iLossLock= -10*L
            iLss2= 0
```

```
      ELSE
          i0= 1
          i9= L
          i1= 1
          nBack= NMark
          iLossLock= 10*L
          iLss2= 0
      END IF
      j= 0
      Weight= 0.0
      iMark= 0
      DO 100 i= i0, i9, i1
          j=j+1
          IF (iADet(i).GE.Nalpha) THEN
              iw= 1
          ELSE
              iw= 0
          END IF
          IF (IsAvg.NE.0) THEN
              Weight= Weight+(iw-Weight)*gMark
              IF (Weight.GE.Th5) THEN
                  iLossLOck= MAX(1,i-NBack)
                  GOTO 109
              ELSE IF (Weight.GE.Th5*0.5) THEN
                  IF (iLss2.EQ.0) iLss2= i
              END IF
          ELSE
              iMark= iMark+ iw
              IF (j.GT.NMark) THEN
                  IF (iADet(i-NBack).GE.Nalpha) iMark= iMark-1
              END IF
              IF (iMark.GE.NMark) THEN
                  iLossLock= i-NBack
                  GOTO 109
              ELSE IF (iMark.GE.NMark/2) THEN
                  IF (iLss2.EQ.0) iLss2= i
              END IF
          END IF
100   CONTINUE 109   CONTINUE
      IF (iLss2.EQ.0) THEN
          IF (IsRev.NE.0) THEN
              iLss2= -5*L
          ELSE
              iLss2= 5*L
          END IF
      END IF

RETURN
      END

C==========================================================================
C NAME: Move part of array A in to array B with boundery constraints.

SUBROUTINE  MOVEA2B(A,B,L,i0,i9)
      INTEGER     A(L), B(L)

DO 10 i= MAX(1,i0),MIN(L,i9)
10    B(i)= A(i)
      RETURN
      END
```

What is claimed is:

1. A method for reducing multipath propagation in a signal, comprising the steps of:

a) sampling said signal to obtain a plurality of sampled symbols;

b) equalizing the time delay characteristics of at least a first subset of said sampled signals by processing said first subset in a first direction and detecting a first prescribed condition, whereby the length of said first subset of sampled symbols is adaptively determined by the detection of said first prescribed condition; and c) equalizing the time delay characteristics of at least a second subset of said sampled symbols by processing said second subset in a second direction and detecting a second prescribed condition, whereby the length of said second subset of sampled symbols is adaptively determined by the detection of said second prescribed condition.

2. The method recited in claim 1, wherein said first and second subsets comprise values from a data block that is bounded by first and second synchronization words.

3. The method recited in claim 2, further comprising the step of:

d) equalizing the time delay characteristics of a third subset of said sampled values by processing a first portion of said third subset in said first direction at least until a predefined point between said first and second subsets is reached and processing a second portion of said third subset in said second direction at least until said predefined point is reached.

4. The method recited in claim 3, wherein said predefined point is the midpoint between said first and second subsets.

5. The method recited in claim 1, wherein said first and second prescribed conditions are detected by determining the mean square error (MSE) in the received symbols after equalization and detecting when the MSE exceeds a predefined limit.

6. The method recited in claim 5, further comprising detecting said first condition by detecting when said MSE exceeds said predefined limit over a first predefined majority of a first set of symbols and detecting said second condition by detecting when said MSE exceeds said predefined limit over a second predefined majority of a second set of symbols.

7. The method recited in claim 1, wherein said equalizing steps employ a decision feedback equalization algorithm.

8. A method for operating a communications system, comprising the steps of:
  a) interleaving a plurality of predefined synchronization words with a plurality of data words to form a user signal;
  b) transmitting said user signal;
  c) receiving the transmitted user signal; and
  d) processing the received user signal to reduce multipath propagation distortion by performing the following steps:
    (i) sampling said signal to obtain a plurality of sampled symbols;
    (ii) equalizing the time delay characteristics of at least a first subset of said sampled symbols by processing said first subset in a first direction until a first prescribed condition is detected, whereby the length of said first subset of sampled symbols is adaptively determined by the detection of said first prescribed condition; and
    (iii) equalizing the time delay characteristics of at least a second subset of said sampled symbols by processing said second subset in a second direction until a second prescribed condition is detected, whereby the length of said second subset of sampled symbols is adaptively determined by the detection of said second prescribed condition.

9. The method recited in claim 8, wherein said first and second subsets comprise values from a data block that is bounded by first and second synchronization words.

10. The method recited in claim 9, further comprising the step of:
  e) equalizing the time delay characteristics of a third subset of said sampled values by processing a first portion of said third subset in said first direction at least until a predefined point between said first and second subsets is reached and processing a second portion of said third subset in said second direction at least until said predefined point is reached.

11. The method recited in claim 10, wherein said predefined point is the midpoint between said first and second subsets.

12. The method recited in claim 8, wherein said first and second prescribed conditions are detected by determining the mean square error (MSE) in the received symbols after equalization and detecting when the MSE exceeds a predefined limit.

13. The method recited in claim 12, further comprising detecting said first condition by detecting when said MSE exceeds said predefined limit over a first predefined majority of a first set of symbols and detecting said second condition by detecting when said MSE exceeds said predefined limit over a second predefined majority of a second set of symbols.

14. Apparatus for reducing multipath propagation distortion in a signal, comprising:
  a) means for sampling said signal to obtain a plurality of sampled symbols;
  b) means for equalizing the time delay characteristics of at least a first subset of said sampled symbols, including means for detecting a first prescribed condition and means for processing said first subset in a first direction until said first prescribed condition is detected, whereby the length of said first subset of sampled symbols is adaptively determined by the detection of said first prescribed condition; and
  c) means for equalizing the time delay characteristics of at least a second subset of said sampled symbols, including means for detecting a second prescribed condition and means for processing said second subset in a second direction until said second prescribed condition is detected, whereby the length of said second subset of sampled symbols is adaptively determined by the detection of said second prescribed condition.

15. The apparatus recited in claim 14, wherein said first and second subsets comprise values from a data block that is bounded by first and second synchronization words.

16. The apparatus recited in claim 15, further comprising:
  d) means for equalizing the time delay characteristics of a third subset of said sampled values, including means for processing a first portion of said third subset in said first direction at least until a predefined point between said first and second subsets is reached and means for processing a second portion of said third subset in said second direction at least until said predefined point is reached.

17. The apparatus recited in claim 16, wherein said predefined point is the midpoint between said first and second subsets.

18. The apparatus recited in claim 14, further comprising means for detecting said first and second prescribed conditions by determining the mean square error (MSE) in the received symbols after equalization and detecting when the MSE exceeds a predefined limit.

19. The method recited in claim 18, further comprising means for detecting when said MSE exceeds said predefined limit over a first predefined majority of a first set of symbols and means for detecting when said MSE exceeds said predefined limit over a second predefined majority of a second set of symbols.

20. The apparatus recited in claim 14, wherein said equalizing means (b) includes a decision feedback equalizer.

21. Apparatus for reducing multipath propagation distortion in a signal, which signal is a sampled time domain signal that comprises a plurality of N symbols, N being an integer, wherein said symbols comprise time delay characteristics, said apparatus comprising:
- detector means for detecting a first prescribed condition among said symbols;
- first means for equalizing the time delay characteristics of said symbols according to a first sequence;
- second means for equalizing the time delay characteristics of said symbols according to a second sequence; and
- select means, responsive to said detector means, for selectively storing the respective outputs of said first and second means, whereby a plurality of sets of equalized symbols are obtained, said sets being respectively equalized according to one of said first and second sequences and being of a length adaptively determined by the detection of said first prescribed condition.

22. The apparatus recited in claim 21, wherein said first sequence comprises said symbols being equalized in the same order as they were generated.

23. The apparatus recited in claim 22, wherein said second sequence comprises said symbols being equalized in the reverse order as they were generated.

24. The apparatus recited in claim 23, wherein said detector means comprises means for detecting a loss of lock condition and said select means comprises means for storing outputs of said second means upon the detection of said loss of lock condition.

* * * * *

UNITED STATES PATENT AND TRADEMARK OFFICE
CERTIFICATE OF CORRECTION

PATENT NO. : 5,257,265
DATED : October 26, 1993
INVENTOR(S) : Chun-Meng Su, Chanchai Poonpol, George M. Peponides It is certified that error appears in the above-indentified patent and that said Letters Patent is hereby corrected as shown below:

Col. 2, line 5, "Within" should be --within--

Col. 7, line 16, "loss-of-look" should be --loss-of-lock--

Col. 10, line 25, after "phase" insert --.--

Col. 10, line 27, after "duration" insert --.--

Col. 21, 1st line of Claim 1, after "propagation" insert --distortion--

Col. 21, Claim 1, subsection (b), (6th line of claim 1, 2nd line of subsection (b), delete the word "signals" and insert therefor --symbols"

Signed and Sealed this

Third Day of January, 1995

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,257,265
DATED : October 26, 1993
INVENTOR(S) : Chun-Meng Su et al.

It is certified that error appears in the above-indentified patent and that said Letters Patent is hereby corrected as shown below:

On the cover page of the patent, at item [73], the Assignee should be corrected to: PACIFIC COMMUNICATION SCIENCES, INC.

Signed and Sealed this

Seventeenth Day of October, 1995

Attest:

BRUCE LEHMAN

Attesting Officer

Commissioner of Patents and Trademarks